United States Patent
Sano et al.

(10) Patent No.: US 7,360,714 B2
(45) Date of Patent: Apr. 22, 2008

(54) LABEL AND RFID TAG ISSUING APPARATUS

(75) Inventors: Kouichi Sano, Shizuoka-ken (JP);
Nobuo Murofushi, Shizuoka-ken (JP);
Yasuhito Kiji, Shizuoka-ken (JP);
Yasuo Matsumoto, Shizuoka-ken (JP)

(73) Assignee: Toshiba TEC Kabushiki Kaisha, Tokyo (JP)

( * ) Notice: Subject to any disclaimer, the term of this patent is extended or adjusted under 35 U.S.C. 154(b) by 168 days.

(21) Appl. No.: 11/079,483

(22) Filed: Mar. 15, 2005

(65) Prior Publication Data

US 2005/0218219 A1    Oct. 6, 2005

(30) Foreign Application Priority Data

Apr. 2, 2004   (JP)   ............................. 2004-110211

(51) Int. Cl.
*G06K 19/06*   (2006.01)
(52) U.S. Cl. .................. 235/492; 235/462.01; 235/474
(58) Field of Classification Search ................ 235/492, 235/375, 462.01, 383; 340/854.6, 572.1
See application file for complete search history.

(56) References Cited

U.S. PATENT DOCUMENTS

| | | | |
|---|---|---|---|
| 6,557,758 B1 | 5/2003 | Monico | |
| 6,593,853 B1 | 7/2003 | Barrett | |
| 6,712,276 B1 * | 3/2004 | Abali et al. | 235/492 |
| 7,055,750 B2 * | 6/2006 | Carrender | 235/472.01 |
| 7,066,667 B2 * | 6/2006 | Chapman et al. | 400/76 |
| 7,073,712 B2 * | 7/2006 | Jusas et al. | 235/451 |
| 7,114,655 B2 * | 10/2006 | Chapman et al. | 235/462.01 |
| 2003/0214388 A1 | 11/2003 | Stuart | |
| 2004/0032443 A1 * | 2/2004 | Moylan et al. | 347/19 |
| 2005/0116034 A1 * | 6/2005 | Satake et al. | 235/432 |
| 2006/0068701 A1 * | 3/2006 | Chapman et al. | 455/41.1 |
| 2006/0249566 A1 * | 11/2006 | Alleshouse | 235/375 |

FOREIGN PATENT DOCUMENTS

JP    2001.229344 A   4/2001
JP    2001-229344     8/2001

* cited by examiner

*Primary Examiner*—Ahshik Kim
(74) *Attorney, Agent, or Firm*—Pillsbury Winthrop Shaw Pittman, LLP

(57) ABSTRACT

A label and RFID tag issuing apparatus comprises a recording apparatus that records information on a production label and an RFID tag reader/writer that writes and reads part of the recorded information to/from an RFID tag. This label and RFID tag issuing apparatus writes a production number to the RFID tag attached to the container if a container for containing an article or articles carrying the production label and RFID tag is judged to be on the container loading plate. The apparatus, subsequently confirming presence of the container on the container loading plate, records on the production label production information including bar-code data corresponding to the production number that has been written to the RFID. Thus, information recorded on the production label and information stored in the RFID tag are tied, and thereby accidental affixing of a wrong production label onto the container can be prevented.

12 Claims, 5 Drawing Sheets

LABEL AND RFID TAG ISSUING APPARATUS

CROSS REFERENCE TO RELATED APPLICATIONS

This application is based upon and claims the benefit of priority from the prior Japanese Patent Application No. 2004-110211 filed on Apr. 2, 2004, the contents of which are incorporated herein by reference.

BACKGROUND OF THE INVENTION (1) Field of the Invention

The present invention relates to a label and RFID tag issuing apparatus comprising a recording apparatus for recording information on a recording medium and an RFID tag reading/writing apparatus. The invention particularly relates to a production label and RFID tag issuing apparatus that issues a production label and an RFID tag, comprising a recording apparatus that records information on a recording medium to be affixed to a container used in factory automation (FA) process or other applications and an RFID tag reading/writing apparatus that can write to the RFID tag coupled with the recording medium part of the information recorded on the recording medium.

(2) Description of Related Art

Today, to manage articles, a bar-code and RFID tag are used in combination. Japanese patent application Kokai publication No. 2001-229344 describes a data processing apparatus that can convert data between bar-code data and RFID tag data and manage articles using the converted data. This data processing apparatus comprises an RFID tag reader/writer, a data converting means for converting data between bar-code data and RFID tag data, a bar-code reader, and a bar-code printer. The apparatus operates such that the data converting means converts bar-code data decoded from a bar-code that is read by a bar-code reader into RFID tag data, which is then written to an RFID tag, while the data converting means converts RFID tag data read from an RFID tag by the RFID tag reader/writer into bar-code data, which is then inputted to a printer and recorded. Thereby, for example, data of a bar-code recorded on a contained article can be registered in an RFID tag of a carried container, and data related to an article can be efficiently managed.

In a FA process, for example, a production article or articles such as personal ornaments contained in a container move between a plurality of work flow stages, at each of which an operator does his/her prescribed work picking up the articles from the container and puts them back to the container after finishing the work. In order to manage the traveling container and production articles therein, an RFID tag storing managing data and a production label recording the managing data are attached to one container so that the managing data can be electronically managed by using the RFID tag and the operator can visually confirm the production article by the production label.

In such a case, the managing data recorded in the production label on the container must correspond to the managing data stored in the RFID tag that is attached to the same container. However, the data processing apparatus described in Japanese patent application Kokai publication No. 2001-229344 is not structured such that a production label and an RFID tag are affixed to the same container wherein issuing of the production label containing managing data to be affixed to the container is related to issuing of an RFID tag containing managing data to be attached to the container. Therefore, a problem arises that an operator accidentally affixes a production label to a wrong container to which an RFID tag that does not correspond to the production label is attached.

SUMMARY OF THE INVENTION

An object of the present invention is to provide an apparatus for issuing a recording medium and an RFID tag coupled with the recording medium, maintaining a tight relation between the recording medium such as production label that records information and the RFID tag to which part of the information of the recording label is written.

Another object of the invention is to provide a recording medium and RFID tag issuing apparatus, which comprises a detecting means for detecting presence of a container containing manufacturing articles to which an RFID tag has been previously provided or is to be attached later, a printer for recording information on a recording medium to be affixed to the container, an RFID tag writing means for writing to the RFID tag part of information recorded on the recording medium, and a control means for authorizing the printer to record the information on the recording medium when the detecting means has detected the presence of the container after the writing means has written the part of the information to the RFID tag.

DETAILED DESCRIPTION OF THE INVENTION

Figure 1:
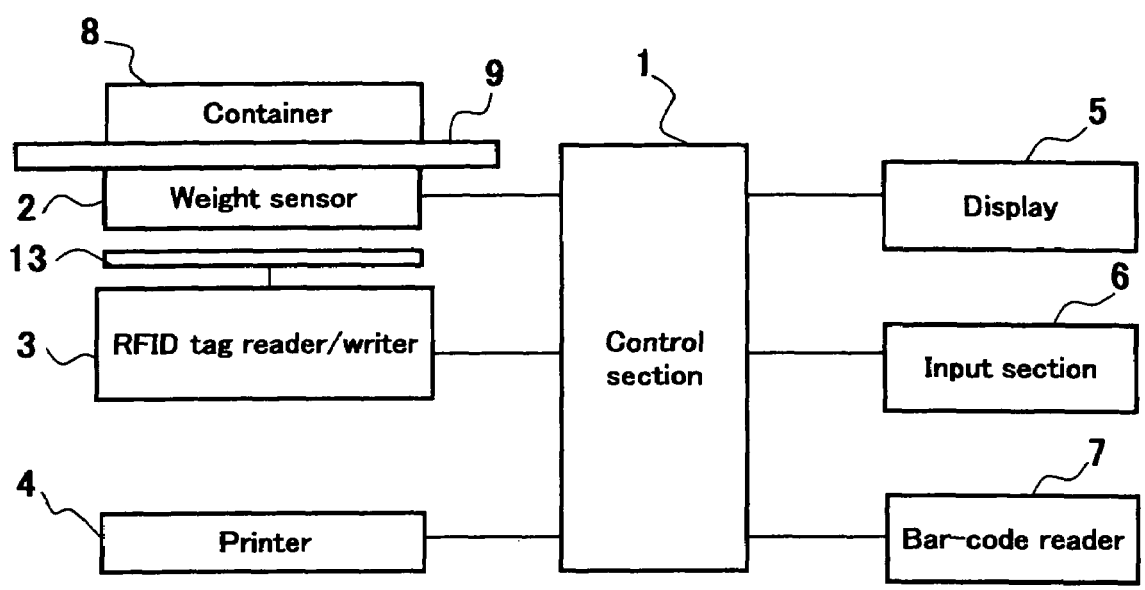
FIG. 1 is a block diagram of a functional structure pertaining to the first embodiment.

Preferred embodiments of the present invention will now be described in more detail with reference to the accompanying drawings. The same numerals are applied to the similar elements in the drawings, and therefore, the detailed descriptions thereof are not repeated.

First Embodiment

As shown in FIG. 1, the label and RFID tag issuing apparatus according to the first embodiment consists of a control section 1, a weight sensor 2 connected to the control section 1, an RFID tag reader/writer 3, a printer 4, a display 5, an input section 6, and a bar-code reader 7. The weight sensor 2 detects the container 1 loaded on a container loading plate 9. The bar-code reader 7 is of a handy type that is convenient to handle in a production process. The control section 1 is a control means consisting of a microprocessor and memory and others, and controls outputting recording data to the printer 4 according to programs, outputting information to be displayed to the display 5, inputting input data from the input section 6, inputting bar-code data from the bar-code reader 7. The printer 4 may be any of a thermal printer, ink jet printer, wire-dot printer, etc.

When this label and RFID tag issuing apparatus is used on a process of manufacturing articles, for example, personal ornaments, the weight sensor 2 is installed in the container loading plate 9 for loading a container 8 containing the manufacturing articles, and detects the container 8 loaded on this container loading plate 9. The control section 1 detects presence of the container by inputting output from the weight sensor 2 and judging if a magnitude of the output conforms to the weight of the container 8.

Figure 2:
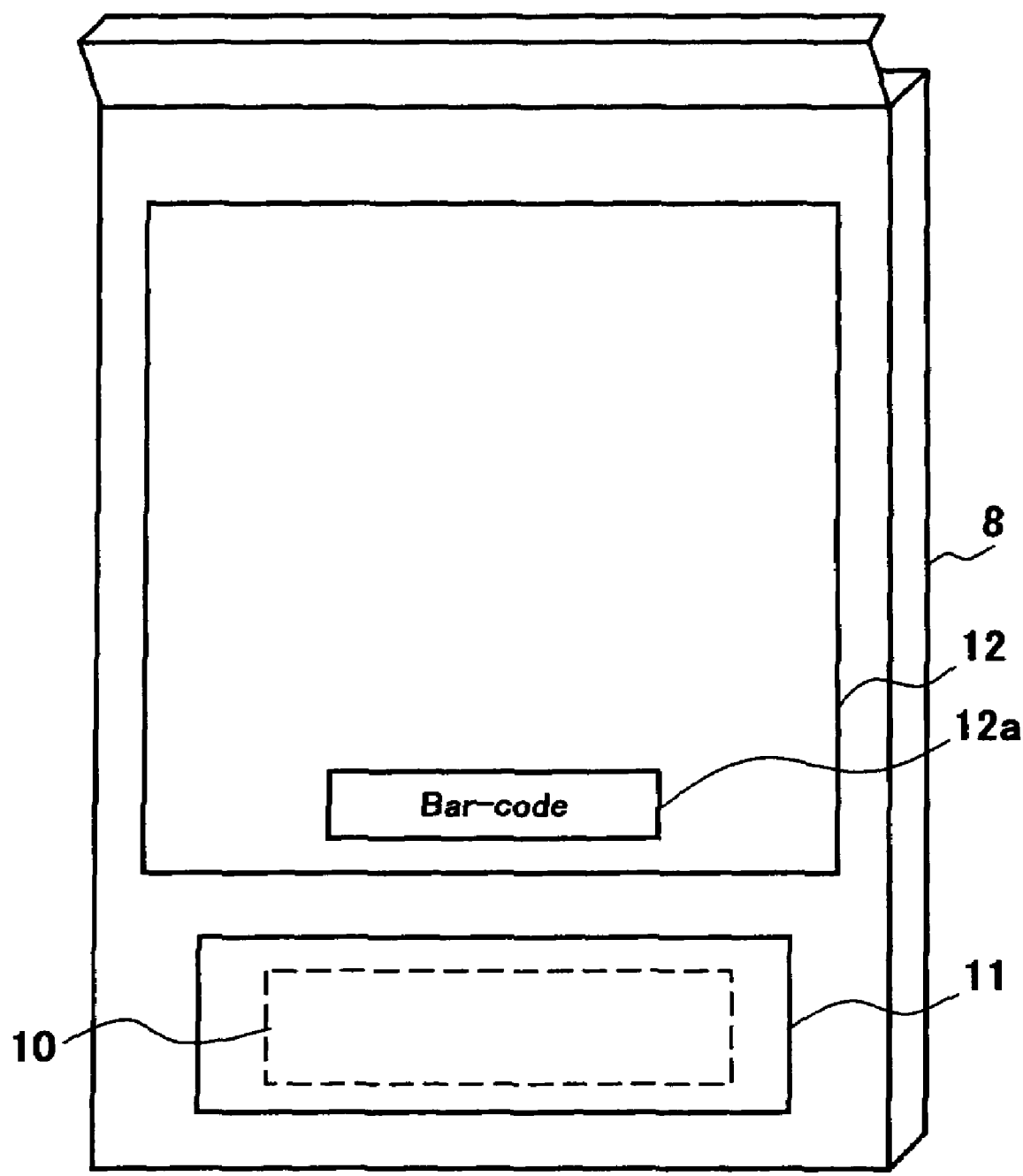
FIG. 2 is a diagram illustrating a container used in the first embodiment.

As shown in FIG. 2, the container 8 is provided with a pocket on a surface of the container at its lower part for containing and holding the RFID tag 10, and the upper part of the container on the surface is designed so that the recording paper 12, which is to become a production label, can be affixed thereto. The production label herein refers to a printed material on which information needed for manufacturing a product such as production number, product name, process instructions instructing works to be carried out in individual stages of the process is recorded. It is so structured that the RFID tag 10 can be contained in and taken out of a container pocket 11. The container 8, which contains trinkets such as personal ornaments, forms a box having a lid so as to prevent the articles contained therein from being scattered. The form of the container may be designed according to the size of an article or articles to be manufactured.

The control section 1 is configured so as to output to the RFID tag reader/writer 3 data to be written to the RFID tag 10 and input data that the RFID tag reader/writer 3 has read from the RFID tag 10. The RFID tag reader/writer 3 is connected to an antenna 13 disposed in the vicinity of the container loading plate 9. The RFID tag reader/writer 3 radiates an electromagnetic wave through the antenna to the container carrying the RFID tag 10 on the container loading plate 9. The RFID tag 10 generates a power from the electromagnetic wave received, writes and reads data to/from the RFID tag 10, and transmits the data to the RFID tag reader/writer 3.

The printer 4 records production information including a bar-code, that is, data pertaining to production on the recording paper 12. The display 5 displays information for indicating to an operator. The input section 6 inputs data to record on the recording paper 12 and data to be written to the RFID tag 10. The bar-code reader 7 is used to read a bar-code 12a on the recording paper 12 when a bar-code is recorded thereon.

Figure 3:
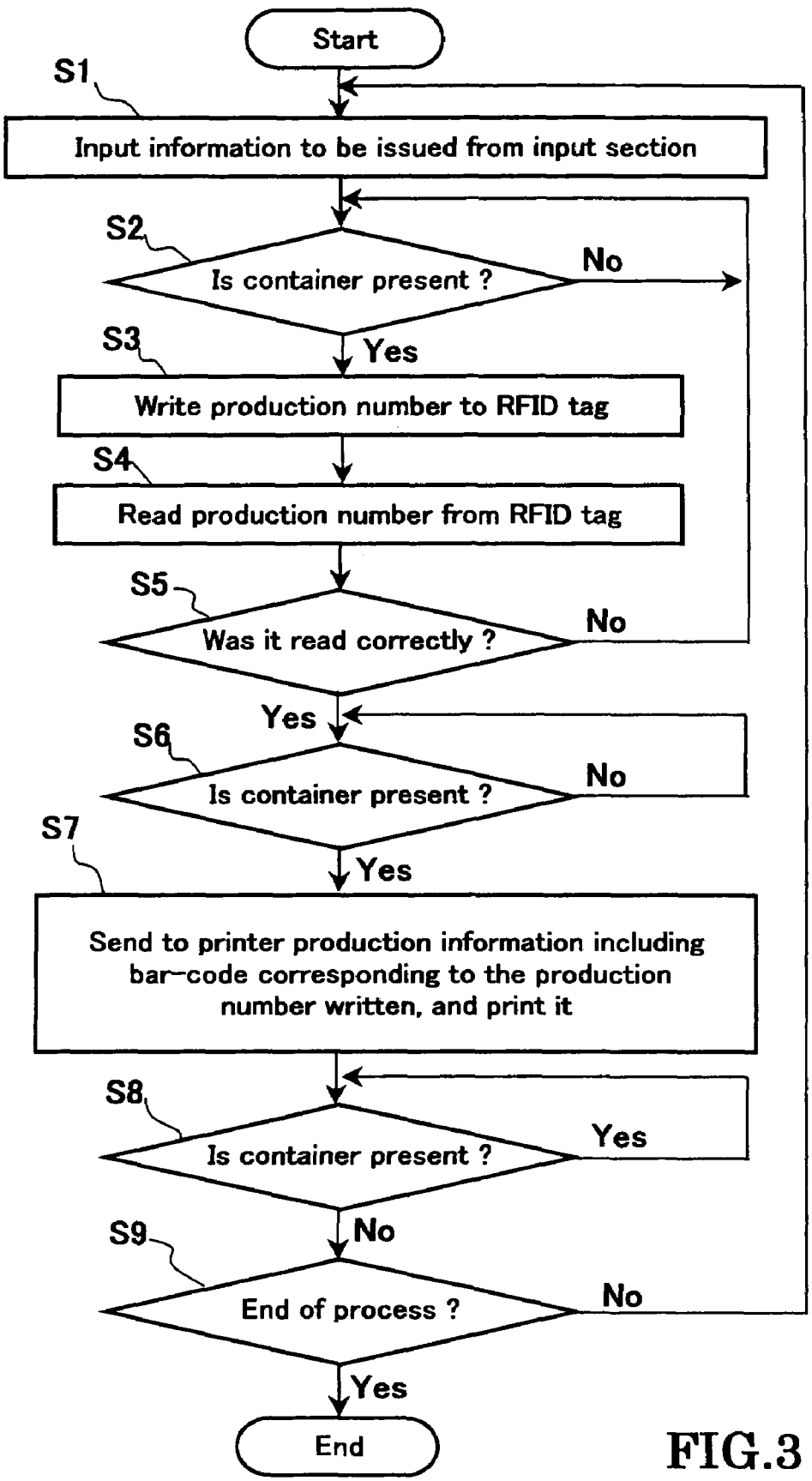
FIG. 3 is a flow chart illustrating a process of label and RFID tag issuing controlled by the control section in the first embodiment.

FIG. 3 is a flow chart illustrating operation of the label and RFID tag issuing apparatus according to this embodiment. In step S1, information to be written and recorded onto the RFID tag and recording paper is inputted from the input section. In step S2, it is judged whether or not the container 8 is on the container loading plate 9 by taking the output from the weight sensor 2.

If presence of the container 8 is detected, in step S3, the control section 1 controls the RFID tag reader/writer 3 so that the RFID tag reader/writer 3 writes part of production information to be recorded by the printer 4, for example, a production number, into the RFID tag 10 attached to the container 8. When the writing is done, in step S4, the RFID tag reader/writer 3 reads the production number that has been written just now. In step S5, the read production number is now compared to one written to examine if the production number has been correctly written to the RFID tag 10. If a judge is made that it is not correctly written, the writing is reiterated.

If a judge is made that it is written correctly, in step S6, presence of the container 8 on the container loading plate 9 is then checked. If presence of the container 8 is confirmed, in step S7, the control section 1 controls the printer 4 so that the printer 4 records on the recording paper 12 information pertaining to production including a bar-code that corresponds to the production number written to the RFID tag. Then, an operator adheres this recording paper 12 on the container 8 to which the RFID tag 10 is attached.

After this recoding has been done, in step S8, the process control keeps monitoring whether or not the container is removed from the container loading plate 9 while observing the weight of the container on the loading plate. If the removal of the container 8 is acknowledged, then in step S9, the apparatus waits entry of "termination of the issue process" from the input section 6. In step S9, if input of the termination is not received, then, the process control waits in step S1 entry from the input section 6 of information to be issued in a subsequent process. If the termination of the issue process is received, the current control of the issue process terminates.

In this embodiment, when an operator inputs information to be issued, wherein the container 8 holding the RFID tag 10 in the pocket 11 in which no data has been written is placed on the container loading plate 9, the control section 1 first confirms the presence of the container 8 on the container loading plate 9 by the output from the weight sensor 2 and writes a production number into the RFID tag 10 controlling the RFID tag reader/writer 3. The production number just written is read back to the apparatus to check if the number has been written correctly. If the correct writing is verified, presence of the container 8 on the container loading plate 9 is rechecked, and production information including a bar-code that corresponds to the production number written to the RFID tag 10 is recorded onto recording paper 12 by the printer 4.

In this manner, the apparatus can write a production number to the RFID tag 10 in a state that the container 8 is placed on the container loading plate 9, and issue recording paper 12 on which production information including a bar-code corresponding to one written to the RFID tag 10 has been recorded, assuring that the container 8 is still on the container loading plate 9. That is, when the recording paper 12 recording production information including a bar-code corresponding to one written to the RFID tag 10 is issued, the container 8 carrying the corresponding RFID tag 10 surely exists on the container loading plate 9.

The operator needs only to take the container 8 on the container loading plate 9 and affix the recording paper 12 just issued on the container 8. By this action, the recording paper 12 which records production information including bar-code 12a corresponding to one written to the RFID tag 10 can be surely affixed on the container 8, as shown in FIG. 2.

Because removal of the container from the container loading plate 9 by the operator automatically leads to a stage that the apparatus waits a subsequent issue process, the subsequent issue process cannot commence in a state that the previous container is being left on the container loading plate 9. Accordingly, there would be no fear that a recording paper 12 recording production information that does not correspond to a production number written in the RFID tag 10 attached to one container 8 could be affixed to the same container 8.

Second Embodiment

Figure 4:
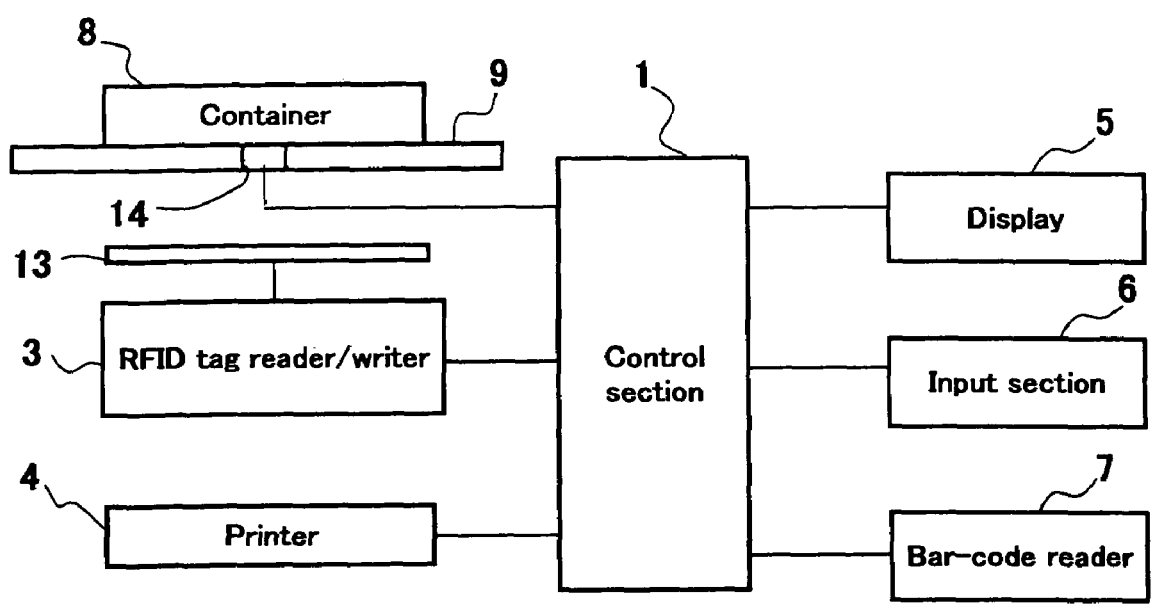
FIG. 4 is a block diagram of a functional structure pertaining to the second embodiment.

FIG. 4 shows a label and RFID tag issuing apparatus using an optical sensor 14 as a detecting means. The structure of this embodiment excluding the optical sensor 14 is the same as one of the fist embodiment.

For the optical sensor, a reflective type that incorporates a combination of a light emitting element and photo acceptance element is used. This optical sensor detects presence of the container 8 on the container loading plate 9, when the container 8 is placed on the container loading plate 9, by the output of the photo acceptance element, which receives light that is emitted from the light-emitting element and then reflected on the container 8. In this way, the same effect can be attained using an optical sensor as the detecting means.

Although the above descriptions were made for structures using the weight sensor and optical sensor, this invention is not limited to such practices. It is possible to make the RFID tag reader/writer 3 serve as double functional apparatus, eliminating use of such sensors. Specifically, first, the RFID tag 10 storing dummy data is prepared beforehand, and the RFID tag reader/writer 3 is provided to operate constantly. In this state, when the container 8 is placed on the container loading plate 9, the RFID tag reader/writer 3 detects the presence of the container 8 on the container loading plate 9 by reading the dummy data from the RFID tag 10. After a real production number has been written to the RFID tag 10, the presence of the container 8 on the container loading plate 9 can be detected by reading the production number. By making the RFID tag reader/writer 3 serve also as a detecting means in this manner, the apparatus structure can be simplified.

Third Embodiment

Figure 5:
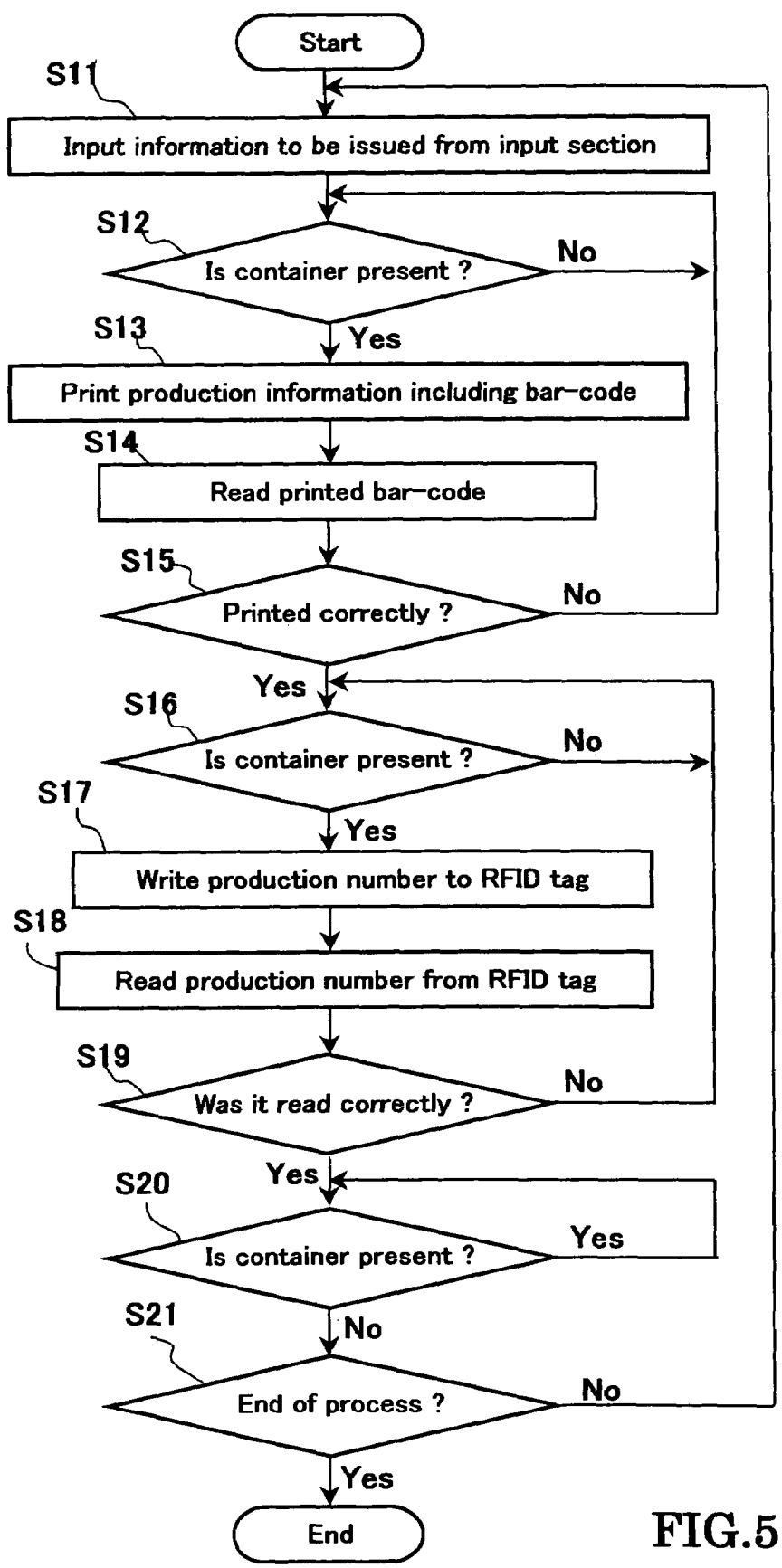
FIG. 5 is a flow chart illustrating a process of label and RFID tag issuing controlled by the control section in the second embodiment.

A structure of the label and RFID tag issuing apparatus according to the third embodiment is shown in FIG. 1. The container 8 used therein carries the recording paper 12 recording a bar-code and the RFID tag 10, as illustrated in FIG. 2. The controller 1 performs the issue process according to the procedure described in FIG. 5. That is, after information to be issued is taken in from the input section 6 in step S11, presence of the container 8 on the container loading plate 9 is judged by the output from the weight sensor in step 12.

After the presence of the container 8 is confirmed, in step 13, the controller 1 makes the printer 4 print on the recording paper 12 production information including a bar-code corresponding to a production number. First, a recording paper 12 is issued, and then, in step 14, the bar-code reader 7 reads the bar-code 12a recorded on the issued recording paper 12. In this instance, the controller 1 makes a display device indicate an instruction urging an operator to read and confirm the recorded bar-code, and the operator operates the bar-code reader 7 to read the recorded bar-code according to the instruction. In step 15, the bar-code that has been read is compared with the bar-code data that has been recorded on the recording paper in step 13 to judge if the data of the bar-code has been correctly recorded.

When correctness of the recording is verified, in step S16, presence of the container 8 on the container loading plate 9 is checked. If the presence of the container 8 is confirmed, in step S17, the controller 1 makes the RFID tag reader/ writer 3 write to RFID tag 10 data corresponding the bar-code, for example, a production number, which is part of information pertaining to production recorded on the recording paper 12. With this writing done, in step S18, the RFID tag reader/writer 3 reads the production number that has just been written. In step S19, the production number that has been read is compared with one that was originally written so that check is made to see if the production number was correctly written to RFID tag 10. If a failure of correct writing is judged, writing to the RFID tag 10 is reiterated.

If correct writing is verified, in step S20, the process control watches if the container 8 is removed from the container loading plate 9 and judges so if it has been done. When the removal of the container 8 is confirmed, in step S21, the process control watches if "termination of the issue process" is received from the input section 6 and judges so if it has been done. Unless it is received, the process control waits entry of information to be issued for a subsequent issue process from the input section 6. If "termination of the issue process" is confirmed, the current issue process terminates.

In this structure of the embodiment, first, production information including a bar-code data corresponding to a production number is recorded on a recording paper 12 in a state that the container 8 is placed on the container loading plate 9. Then, the production number is written to the RFID tag 10 in a state that the container 8 is placed on the container loading plate 9. Because the container 8 to which the recording paper 12 is affixed remains on the container loading plate 9 until the production number is written on it, the operator only needs to withdraw the container 8 on the container loading plate 9 and affix the recorded paper 12 to the container at the point when the writing of the production number has been completed. In this case also, the recording paper 12 recording the production information including a bar-code corresponding to the production number written to the RFID tag 10 can be certainly affixed to the container 8.

In this embodiment also, an optical sensor can be used as a detecting means instead of the weight sensor. Alternatively, the RFID tag reader/writer may be used as a dual-purpose apparatus having a function of the detecting means by writing dummy data in the RFID tag 10.

In the above embodiments, descriptions have been made for structures in which presence of the container carrying an RFID tag is detected by a detecting means. This invention is not limited to such structures. There may be such a structure in which the container and RFID tag are separated and only RFID tag is detected by a detecting means. Even in this case, since the RFID tag can be related to a recording paper, the two media would need to be attached to a common container.

Although the above descriptions have been made as examples using a production label like one used in automated factory processes, the invention is not limited to those practices. This label and RFID tag issuing apparatus can be adapted in applications of stock control and physical distribution management, wherein a label that records data related to data having been written to an RFID tag is affixed to a container.

Numerous modifications and variations of the present invention are possible in light of the above teachings. It is therefore to be understood that, within the scope of the appended claims, the present invention can be practiced in a manner other than as specifically described therein.

What is claimed is:

1. A label issuing apparatus, comprising:
   a sensor for detecting a container or a container carrying an RFID tag, the sensor outputting a detection signal when the sensor detects the container;
   a printer for recording a first information on a recording medium to be affixed to the container;
   an RFID tag reader/writer for writing a second information included in the first information to said RFID tag when the detection signal is outputted from the sensor; and
   a controller for permitting said printer to record the first information on the recording medium provided that the detection signal is outputted from said sensor after said RFID tag reader/writer writes the second information to the RFID tag.

2. An apparatus according to claim 1, wherein said controller permits said RFID tag reader/writer to write the second information to a subsequent RFID tag when said printer completes recording on the recording medium and no detection signal is output from said sensor.

3. An apparatus according to claim 1, wherein said sensor is a weight sensor.

4. An apparatus according to claim 1, wherein said sensor is an optical sensor.

5. An apparatus according to claim 1, wherein said printer records on the recording medium a bar-code that contains, either in part or in full, the second information that has been written to said RFID tag.

6. A label issuing apparatus, comprising:
   detecting means for detecting presence of a container by reading data written to an RFID tag attached to said container;
   a printer for recording a first information on a recording medium to be affixed to the container;
   an RFID tag reader/writer for writing to said RFID tag a second information included in the first information when the detecting means detects presence of the container; and
   a controller for permitting said printer to record the first information on the recording medium, provided that said detecting means detects the presence of the container after said RFID tag reader/writer has written the second information to said RFID tag.

7. An apparatus according to claim 6, wherein said printer records on the recording medium a bar-code that contains, either in part or in full, the second information that has been written to the RFID tag.

8. A label issuing apparatus, comprising:
   a sensor for detecting a container carrying an RFID tag;
   a printer for recording a bar-code corresponding to information included in a first information and the first information on a recording medium to be affixed to the container;
   a bar-code reader for reading the bar-code recorded on the recording medium;
   an RFID tag reader/writer for writing a second information corresponding to the bar-code to the RFID tag; and
   a controller for permitting said RFID tag reader/writer to write the second information to said RFID tag, provided that information corresponding to the bar-code read by the bar-code reader conforms to the information included in the first information recorded on the recording medium and said sensor detects the presence of said container.

9. An apparatus according to claim 8, wherein said controller permits said printer to record the bar-code on a subsequent recording medium to be affixed to a subsequent container, when said RFID tag reader/writer completes writing to the RFID tag the second information and said sensor detects absence of the container carrying the RFID tag.

10. A label issuing apparatus, comprising:
   a sensor configured to detect a container carrying an RFID tag;
   a printer configured to record a first information on a recording medium to be attached to the container;
   an RFID tag writer configured to write a second information included in the first information recorded on the recording medium to said RFID tag when the sensor detects the container; and
   a controller configured to permit said printer to record the first information on the recording medium provided that said sensor detects the container after said RFID tag writer has written the second information to said RFID tag.

11. An apparatus according to claim 10, wherein said sensor is a weight sensor.

12. An apparatus according to claim 10, wherein said sensor is an optical sensor.

* * * * *